(12) United States Patent
Askestad

(10) Patent No.: US 10,281,076 B2
(45) Date of Patent: May 7, 2019

(54) COUPLER DEVICE AND METHOD FOR USING THE SAME

(71) Applicant: NATIONAL OILWELL VARCO NORWAY AS, Kristiansand S (NO)

(72) Inventor: Sigmund Askestad, Tvedestrand (NO)

(73) Assignee: NATIONAL OILWELL VARCO NORWAY AS, Kristiansand S (NO)

( * ) Notice: Subject to any disclaimer, the term of this patent is extended or adjusted under 35 U.S.C. 154(b) by 685 days.

(21) Appl. No.: 14/892,552

(22) PCT Filed: May 22, 2013

(86) PCT No.: PCT/NO2013/050092
§ 371 (c)(1),
(2) Date: Nov. 19, 2015

(87) PCT Pub. No.: WO2014/189381
PCT Pub. Date: Nov. 27, 2014

(65) Prior Publication Data
US 2016/0169433 A1     Jun. 16, 2016

(51) Int. Cl.
*F16L 37/62* (2006.01)
*F16L 37/30* (2006.01)
*F16L 37/00* (2006.01)
*F16L 23/04* (2006.01)

(52) U.S. Cl.
CPC .............. *F16L 37/62* (2013.01); *F16L 37/002* (2013.01); *F16L 37/30* (2013.01); *F16L 23/04* (2013.01)

(58) Field of Classification Search
CPC .......... F16L 23/04; F16L 37/62; F16L 37/002
USPC ....................................................... 285/364
See application file for complete search history.

(56) References Cited

U.S. PATENT DOCUMENTS

| 2,353,572 A | * | 7/1944 | Kuster | F16L 23/08 285/367 |
| 2,836,117 A | * | 5/1958 | Lankford | F16B 2/02 285/365 |
| 3,044,657 A | * | 7/1962 | Horton | F16L 25/065 285/332 |
| 3,403,931 A | | 10/1968 | Crain | |

(Continued)

FOREIGN PATENT DOCUMENTS

| EP | 0384554 | 8/1990 | |
| EP | 373250 A1 | * 12/1998 | ............. F16L 23/04 |
| NO | 20110784 | 12/2012 | |

OTHER PUBLICATIONS

English Translation of Abstract for No. 20110784 (2 pages).
Written Opinion dated Feb. 13, 2014 for PCT/NO2013/050092 from the International Preliminary Examination Authorities.

*Primary Examiner* — David Bochna
(74) *Attorney, Agent, or Firm* — Conley Rose, P.C.

(57) ABSTRACT

A coupler device for coupling first and second pipe bodies and a method for using the coupler device are disclosed, the coupler device including—a first connector hub configured to be connected to the first pipe body;
a second connector hub configured to be connected to the second pipe body;
a clamp configured to clamp the first and second connector hubs together, the clamp comprising two or more clamping members; and
two or more clamping rods, along which the clamping members are configured to be displaced, wherein the at least two clamping rods are rigidly connected to the first connector hub.

17 Claims, 15 Drawing Sheets

(56) References Cited

U.S. PATENT DOCUMENTS

| | | | | |
|---|---|---|---|---|
| 4,063,758 A | * | 12/1977 | Westberg | F16L 23/04 |
| | | | | 285/364 |
| 4,146,261 A | * | 3/1979 | Edmaier | F16B 2/14 |
| | | | | 285/364 |
| 4,327,942 A | * | 5/1982 | Abbes | F16L 37/26 |
| | | | | 285/365 |
| 4,611,839 A | | 9/1986 | Rung | |
| 5,188,397 A | | 2/1993 | Hynes | |
| 5,372,392 A | * | 12/1994 | Dunn | F16L 23/04 |
| | | | | 285/364 |
| 5,443,581 A | | 8/1995 | Malone | |
| 5,951,066 A | * | 9/1999 | Lane | F16L 37/096 |
| | | | | 285/364 |
| 6,267,419 B1 | | 7/2001 | Baker | |
| 8,430,433 B2 | * | 4/2013 | Maier | F04D 29/624 |
| | | | | 285/406 |
| 8,740,260 B1 | * | 6/2014 | Liew | E21B 33/03 |
| | | | | 285/364 |
| 2008/0265568 A1 | | 10/2008 | Bekkevold | |

\* cited by examiner

COUPLER DEVICE AND METHOD FOR USING THE SAME

CROSS-REFERENCE TO RELATED APPLICATIONS

This application is a 35 U.S.C. § 371 national stage application of PCT/NO2013/050092 filed May 22, 2013 and entitled "Coupler Device and Method for Using the Same," which is hereby incorporated herein by reference in its entirety for all purposes.

STATEMENT REGARDING FEDERALLY SPONSORED RESEARCH OR DEVELOPMENT

Not applicable.

The present disclosure relates to a coupler device. More specifically the disclosure relates to a coupler device for coupling first and second pipe bodies.

BACKGROUND

A coupler device may be used for, but is not limited to, connecting and de-connecting conduits intended for transfer of pressurized fluids, such as hydrocarbon-containing fluids. Typically, such a coupler device will be used for offloading crude oil or gas from the stern of a floating, production, storage and offloading (FPSO) unit to a shuttle vessel. One part of the coupler device will typically be installed on the shuttle vessel, while another part is carried on the FPSO unit.

Coupler devices using clamps and connector hubs are extensively used for connecting conduits carrying pressurized fluids. These coupler devices include connector hubs on the ends of the two tubular fluid conduits to be connected. Each connector hub has a flat inner face with a seal ring groove in the face. The opposite, outer side of each connector hub has an inclined annular surface. The inclined annular surfaces mate with inclined annular surfaces on a clamp that can force the faces of the two connector hubs axially into engagement and, at the same time, move the seal ring grooves in each face into sealing engagement with a seal ring. Bringing the faces of the two connector hubs into engagement gives the connection structural stability. Clamps and connector hubs provide an alternative to standard flange connections.

Due to safety reasons and for efficiency of operation it is desirable to have a coupling and decoupling process of the connector hubs that is both quick and reliable.

There is a range of prior coupler designs using clamps as coupling means for coupling pipe conduits, where the clamps use bolts as tightening/pre-tensioning means. These couplers are mainly used for permanent connections, and auxiliary equipment for handling these couplers is required. The large bolts generally require large and heavy pre-tensioning equipment.

Coupler devices using clamps and connector hubs are generally designed for manual make up. Clamps for high pressure and large bore conduits are typically large, heavy, and difficult to handle, and it is challenging to obtain an even pressure distribution between the clamp and the connector hubs. Such coupler devices generally are also quite time consuming to make up, requiring special handling tools. Both the bolts and the tensioning equipment are typically large and heavy, as well as expensive.

Coupling devices with clamps for connector hubs with integrated valves are getting even larger due to the larger diameter required for housing the valve equipment. Auxiliary equipment is then required to handle the clamps, and the heavy bolts require special and large equipment for pre-tensioning. This is especially a handicap for coupler devices assigned for repeated coupling and decoupling during operation, and especially for operations where time is crucial.

U.S. Pat. No. 3,403,931 discloses a coupler device with two segmented clamps bolted together by two sets of two bolts. The two segmented clamps grip around conically shaped connector hubs. The two hub connectors are pressed towards a seal ring therebetween when the bolts are tensioned up.

Clamps with one bolt in each end are disclosed in U.S. Pat. No. 4,611,839.

U.S. Pat. No. 4,725,080 discloses a coupler device for remote assembling and disassembling a Grayloc® type connector between a pipe and a closure for the pipe. This coupler device uses one hydraulic actuator for each of two clamping members for moving the clamping members into contact with respective connector hubs. Clamping rods are bolted onto the clamping members. Further, one stud tensioner is provided for each clamping bolt for rotating the clamping nuts. The stud tensioners operate by applying torque to the nuts. The stud tensioners themselves, along with sleeves, are moved into position by another actuator. It is not disclosed how the stud tensioner engages the nuts. The tensioners and sleeves are guided by some means as the clamps are moving toward the hub.

U.S. Pat. No. 5,443,581 describes a coupler device with clamp and connector hubs incorporating a flat adapter ring arranged between the two connector hubs. The adapter ring has tapped holes holding one stud bolt extending outwardly through openings in each of the clamp segments, and with nuts on the outside of the clamp segments for pressing the clamp segments towards the connector hubs into connected position. This arrangement is especially designed for hub connections stacked in a vertical axis, such as in blowout preventers. A drawback with this solution is that the clamp is unstable when supported by one rod only during the idle conditions prior to connect up. Further, such an insert ring will not have substantial anchoring for supporting heavy weights prior to connect up. The insert ring may be troublesome to insert in cases where the pipe line is arranged horizontally, and the handling problems with the clamps will be much the same as for standard clamps without the rods. The connector hubs have flat mating faces throughout the pipe section leaving all the centralizing and shear loads to be handled by the seal rings. Such seal rings may thus easily be damaged during mating operation, and they will only offer a centralizing effect during the last few millimeters prior to "touch down"—and offer no assistance to control of the angular deviation. Such an insert ring requires two sealing surfaces yielding one additional potential leakage source.

U.S. Pat. No. 7,891,713 B2 describes a coupler device using clamps hinged in one end and pre-tensioned by one bolt in the other end. It is not revealed if the clamps are fixed to the pipe. This coupler device is representative of various versions of ring type clamps, and requires either more than two clamps and/or clamps with complicated geometry as described in said patent. One of the problems with this type of coupler device is free axial access for the connector hub part of the pipe to be connected. The ring type clamps require room over a full 360°, leaving no room for other equipment such as valve actuating means required for quick release couplers where valves are required close to the interface section. Another challenge with this coupler device is to keep the clamps at a correct axial position relative to the connector hubs during coupling. The forces in the pivoting links are huge compared with the requirement to keep those links moderately sized. At disconnect, after an extended time in operation, the clamps may get stuck and may be hard to release.

The above mentioned prior art coupler devices mainly utilize torque control of bolts for pre-tensioning the connector hubs and the connection faces. According to general uncertainties regarding setting a correct design friction coefficient, there will correspondingly be an uncertainty as to how large the actual preload of the coupler device will be when made up.

SUMMARY OF THE DISCLOSURE

Disclosed herein is a coupler device comprising a first connector hub configured to be connected to the first pipe body; a second connector hub configured to be connected to the second pipe body; a clamp configured to clamp the first and second connector hubs together, the clamp comprising two or more clamping members; and two or more clamping rods, along which the clamping members are configured to be displaced. Also disclosed is a method for coupling and decoupling first and second pipe bodies.

In a first aspect, disclosed is a coupler device for coupling first and second pipe bodies, the coupler device comprising:
 a first connector hub configured to be connected to the first pipe body;
 a second connector hub configured to be connected to the second pipe body;
 a clamp configured to clamp the first and second connector hubs together, the clamp comprising two or more clamping members; and
 two or more clamping rods, along which the clamping members are configured to be displaced, wherein the at least two clamping rods are rigidly connected to the first connector hub.

In one embodiment, the clamping members may be formed with inner inclined clamping surfaces fitting complementary to outer inclined clamping surfaces on the connector hubs for clamping the connector hubs together. Moderate inclination angles, in the range of 7° to 20° may be beneficial for obtaining high amplification effects on the axial preloading between the two connector hubs while still keeping the forces arising from friction at a manageable level.

In one embodiment, inclined mating surfaces on the first connector hub may fit complementary to inclined mating surfaces on the second connector hub. The two connector hubs thus may be centered with respect to each other prior to clamping the connector hubs together. Bringing the connector hubs together and centering by means of the inclined mating surfaces may be done manually or by mechanized means. An example of such mating surfaces is described in NO 20110784.

The two or more clamping members may be substantially evenly distributed around the first connector hub. This may be beneficial for ensuring an even distribution of clamping forces around the connector hubs. In specific embodiments there may be two, three, or four clamping members.

In one embodiment, each of the two or more clamping members may be displaceable along two spaced apart, substantially parallel clamping rods. Two clamping rods per clamping member may yield a better stability and easier handling of the clamping members. Further, two clamping rods per clamping member may give a better load distribution over the circumference of the clamping members as axial forces acting on the clamping members may be distributed over a larger area of the clamping members.

In one embodiment, each clamping member may be displaceable along the clamping rods by means of at least one hydraulic actuator, each hydraulic actuator comprising a hydraulic cylinder being arranged in a cylinder housing. The coupling device may comprise one hydraulic actuator per clamping rod. The hydraulic actuators may thus provide axial forces for displacing the clamping members towards the hub connectors so as to clamp the connector hubs together. The coupler device may thus be assigned for quick connection and de-connection operations as well as remotely operated operations. Hydraulic actuators offer an accurate setting of the tightening forces in a controlled manner compared with torque tool operations for bolt tightening The pistons displaceable in the cylinders of the hydraulic actuators may be rigidly connected to the clamping rods, whereby the clamping rods may serve also as piston rods. The clamping rods may thus be running through the cylinders of the hydraulic actuators.

Further, one end of each cylinder housing may be connected to a clamping member. The whole hydraulic actuator-clamping member assembly may thus be displaceable relative to its respective clamping rod, which is rigidly connected to the first connector hub. The hydraulic fluid may thus exercise its force by pressing the clamping member inwardly towards the connector hubs. The reaction load is handled by the piston which is then anchored in the connector hub through the clamping rod. Forces from hydraulic fluid being pressurized in the cylinder may thus be transferred to a clamping member.

Even further, the one end of each cylinder housing may be connected to the clamping member via an elastic pad. The elastic pad may provide advantageous shear flexibility yet with a high axial load bearing capacity, i.e. in the direction of the clamping rod. The elastic pad and the clamping member may have large bore holes with ample clearance to the clamping rod permitting radial displacements of the rod in the bore hole. In one embodiment, the elastic pad may be an elastomer pad.

In one embodiment, the first and second connector hubs may be provided with closure for closing a pipe conduit. The closure of the first connector and hub may be hydraulically operated. The closure may be a valve arrangement, where each connector hub is provided with valve members configured to close the respective pipe body to which the connector hub is connected.

In one embodiment, the second connector hub is provided with biasing means for closing the closure as the second connector is decoupled from the first connector hub. The biasing means, which may be a coil spring, may thus quickly and automatically close the second pipe body when the second connector hub is removed from the first connector hub.

In one embodiment, each of the clamping rods may be provided with safety locking means. The safety locking means may provide a backup for hydraulic pressure in an actuator for a clamping member, or the safety locking means may be used as a mechanical lock for holding back the remainder of the loads on the clamping members.

Further the safety locking means may comprise wedges configured to engage with locking nuts provided at distal ends of the clamping rods. The nuts may be locked in position along threaded outer portions of the clamping rods. The wedges may be hydraulically operated.

In one embodiment, the locking nuts may have a diameter which is smaller than the diameter of a bore provided in the cylinder housing through which the clamping rod is extending. The cylinder may be displaced relative to the locking nuts so that the locking nuts may be located in the bore of the cylinder housing. The coupler device may thus be formed with a relatively compact design, and the clamping members which may be rigidly connected to the cylinder housing, can be retracted from a coupling position by displacing the cylinder housing outwards beyond the clamping nuts.

In another embodiment, each clamping member may be displaceable along the clamping rod by means of clamping nuts. This embodiment may be used for smaller coupler devices.

In one embodiment, the clamping members may be provided with substantially arc-shaped outer clamping surfaces having an inner radius and an outer radius, wherein the inner radius is substantially equal to that of the radius of the connector hubs. This may be beneficial for quick release of the connector hubs from the clamping members since the clamping members will have to be displaced a minimal distance to release the connector hubs, which may also enable a compact design of the coupler device.

There is also described a vessel provided with a coupler device according to one or more of the devices described above.

According to a second aspect, disclosed is a method for coupling first and second pipe bodies by means of a coupler device according to one or more of the devices described above, the method comprising the steps:

connecting the first pipe body to the first connector hub;
connecting the second pipe body to the second connector hub; and
bringing the connector hubs into proximity and substantially centralizing the two connector hubs, wherein the method further comprises the step of:
displacing the clamping members along the clamping rods towards the connector hubs to clamp the connector hubs together.

In one embodiment, the method may further comprise transferring fluid between the first and second pipe bodies through the connector hubs.

Further, the method may also comprise displacing the clamping members away from the connector hubs to release the connector hubs from each other.

BRIEF DESCRIPTION OF THE DRAWINGS

Hereinafter, examples of exemplary, non-limiting embodiments are described and are depicted on the accompanying drawings, where.

DETAILED DESCRIPTION OF THE DISCLOSED EXEMPLARY EMBODIMENTS

Figure 1:
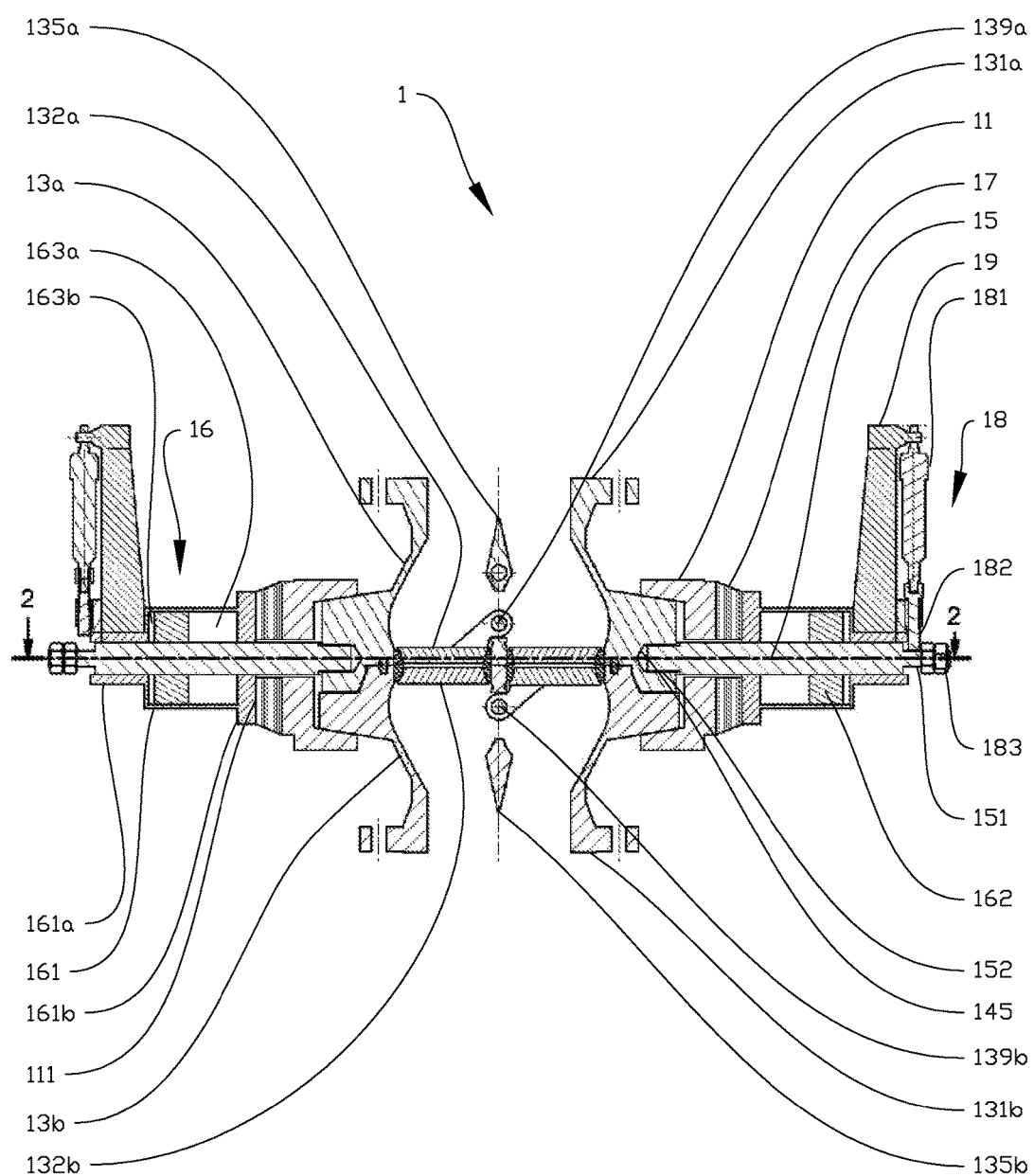
FIG. 1 shows in a cross-sectional side view a coupler device according to at least one embodiment of the present disclosure.

In the following, the reference numeral 1 denotes a coupler device made in accordance with principles disclosed herein. Identical reference numerals refer to identical or similar components. Most of the figures, except FIGS. 1A, 1B, are symmetrical or close symmetrical about one or two axes in the paper plane. For clarity and for avoiding too many reference numerals on each figure, identical or similar components are numbered only once per figure.

Figure 1A:
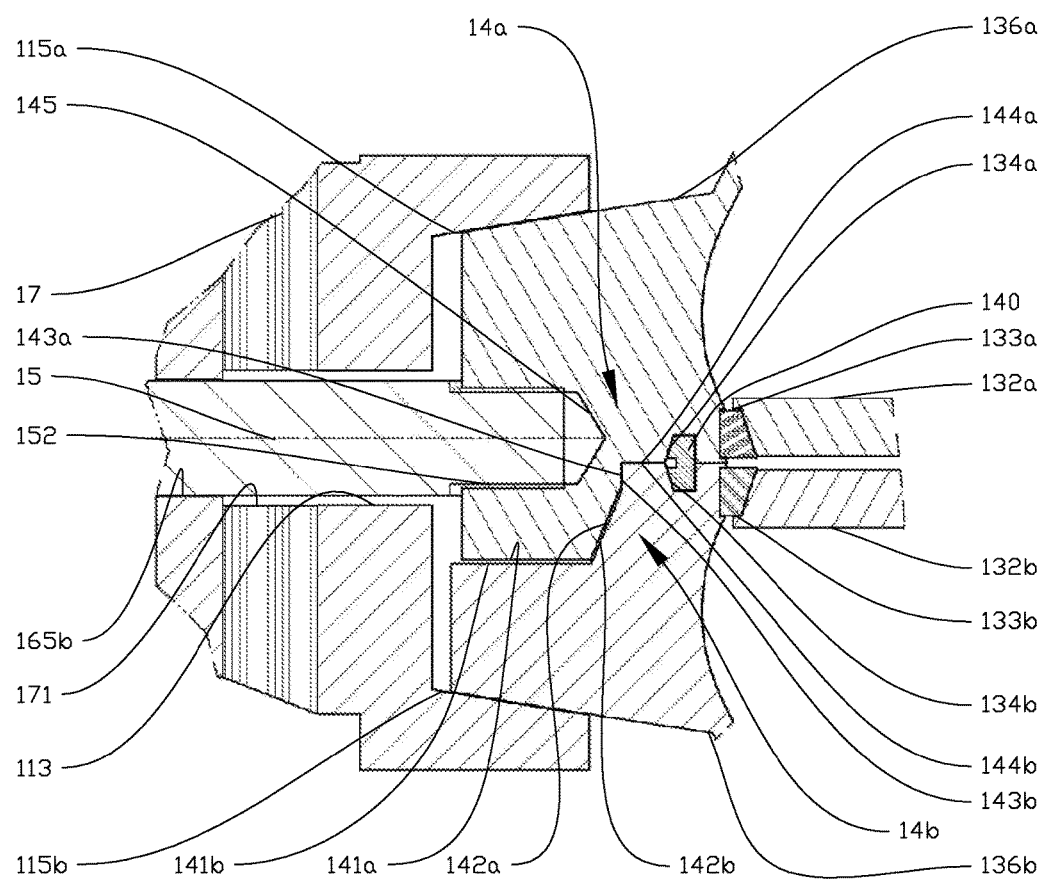
FIG. 1A shows in a larger scale a detail from FIG. 1.
Figure 1B:
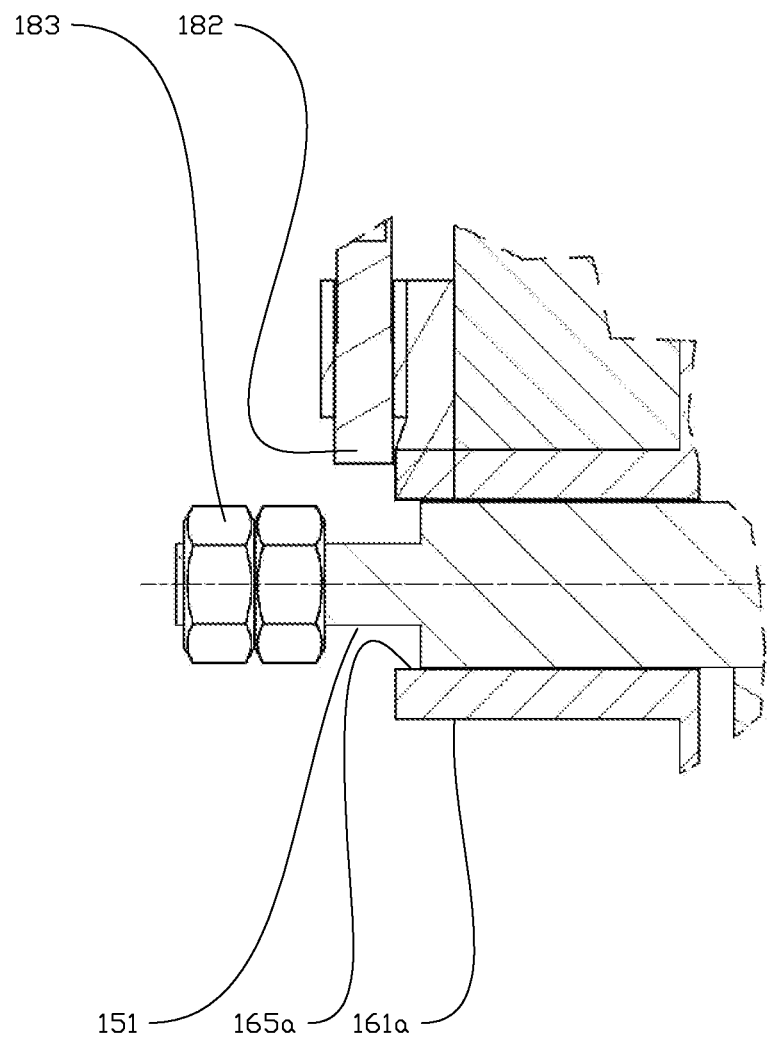
FIG. 1B shows in a larger scale a detail from FIG. 1.

In FIG. 1, a cross-sectional side view of a coupler device 1 is shown. The coupler device 1 comprises a first connector hub 13a and a second connector hub 13b. The two connector hubs 13a, 13b are configured to be connected to first and second pipe bodies (not shown) by means of connection flanges 131a, 131b. The coupler device 1 of FIG. 1 is shown in a first position clamping the two connector hubs 13a, 13b together by means of a clamp comprising two spaced apart clamping members 11. The coupler device 1 further comprises two clamping rods 15 along which the clamping members 11 are configured to be displaced towards the connector hubs 13a, 13b for clamping the two connector hubs 13a, 13b axially together, and away from the connector hubs 13a, 13b for releasing the connector hubs 13a, 13b from each other. In the embodiment of FIG. 1, the first connector hub 13a will typically be permanently installed on a vessel, while the second connector hub 13b will be provided from a FPSO unit or the like.

As can best be seen in FIG. 1A, the first connector hub 13a is formed with a mating surface 14a fitting complementary to a mating surface 14b on the second connector hub 13b. The mating surfaces 14a, 14b are provided with first substantially flat portions 144a, 144b. The first substantially flat portion 144a of the mating surface 14a of the first connector hub 13a is provided with a seal ring 140 in a recess 134a, the seal ring 140 fitting complementary into a recess 134b of the second substantially flat portion 144b of mating surface 14b of the second connector hub 13b. The mating surfaces 14a, 14b may be provided with at least one additional seal ring (not shown) for improved sealing. A cavity between the seal rings may then be used for leak testing subsequent to a connect-up. The mating surfaces 14a, 14b is further formed with cylindrical portions 143a, 143b for keeping the connector hubs 13a, 13b in correct radial position relative to each other during a coupling operation. Further, the mating surfaces 14a, 14b are formed with inclined portions 142a, 142b for centering the connector hubs 13a, 13b relative to each other during a coupling operation. The mating surfaces 14a, 14b further comprise second substantially flat portions 141a, 141b. During coupling, the second substantially flat portions 141a, 141b of the mating surfaces will be slightly spaced apart from each other. However, the second flat portions 141a, 141b of the mating surfaces 14a, 14b will still be sufficiently close to each other to be used for control of angular deviation between the first and second connector hubs 13a, 13b during a coupling operation. In an alternative, the mating surfaces 14a, 14b may be mating in one level, instead of two as described above. A person skilled in the art will know that the first substantially flat portions 144a, 144b in certain embodiments may be slightly conical with a step outside the seal ring 140, as described in compact flange standards, e.g. in the Norsok standard.

Still referring to FIG. 1A, the clamping members 11 are formed with inner inclined clamping surfaces 115a, 115b fitting complementary to oppositely inclined clamping surfaces 136a, 136b on the first and second connector hubs 13a, 13b. The complementary fitting surfaces 115a, 136a and 115b, 136b feature the characteristics of a wedge for the clamping member 11 when it is pressed towards the connector hubs 13a, 13b. A moderate cone angle/inclination of 7-20° may be beneficial for obtaining high amplification effects from the forces pressing the clamping members 11 towards the connector hubs 13a, 13b to the axial preloading of the connector hubs 13a, 13b, while at the same time keeping friction and thus the necessary releasing forces at a manageable level. A high pre-loading of the mating surfaces 144a, 144b may be advantageous for the structural integrity of the two connector hubs 13a, 13b, and also for avoiding relative movement between the recesses 134a, 134b in which the seal ring 140 is placed.

Each connector hub 13a, 13b is further provided with closure in the form of a set of double valve vanes 132a, 132b. The valve vanes 132a, 132b are hingedly suspended in vane supports 135a, 135b placed centrally in the connector hubs 13a, 13b, whereby the connector hubs 13a, 13b function as valve housings for the valve vanes 132a, 132b. Together with sealing arrangements 133a, 133b, the valve vanes 132a, 132b are configured to sealingly close the pipe bodies (not shown) when the connector hubs 13a, 13b are disconnected from each other. The valve vanes 132a of the first connector hub 13a are configured to be operated by means of a valve actuator 130, see e.g. FIGS. 2 and 11, which in the embodiment shown is a hydraulic actuator. Further, the valve vanes 132b of the second connector hub 13b are configured to be automatically closed when the connector hubs 13a, 13b are disconnected from each other. The functionality of the valve arrangement 132a, 132b will be described in further detail below with reference to FIGS. 11-13.

The coupling device 1 of FIG. 1 is further provided with two pairs of clamping rods 15. Each clamping member 11 is displaceable along one pair of substantially parallel clamping rods 15, each clamping member 11 being formed with bores 113 through which the clamping rods 15 are extending, see FIG. 1A. The bores 113 are formed with ample clearance to the rods 15, thereby allowing some radial displacement of the clamping rods 15 in the bores 113. Each clamping rod 15 is provided with a threaded proximal end 152 rigidly connected in tapped holes 145 in the first connector hub 13a. In an alternative embodiment, the first connector hub 13a and the clamping rods 15 may be formed as one unit.

Figure 3:
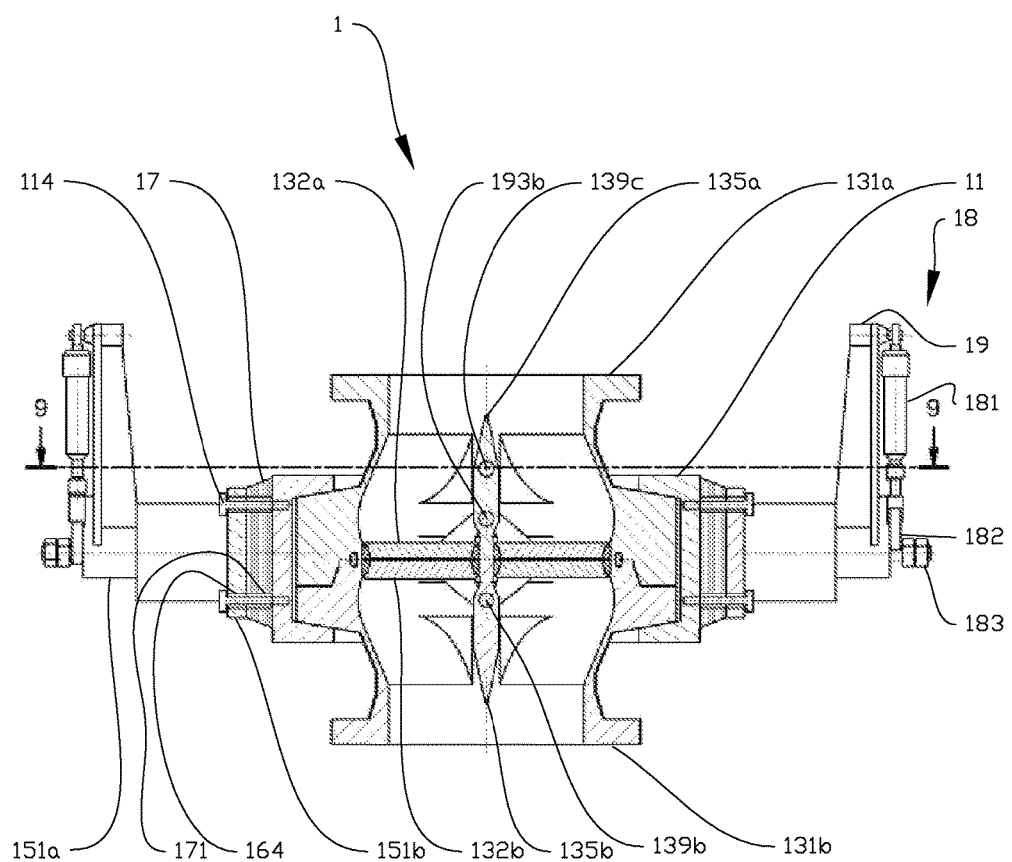
FIG. 3 shows as seen through the line 3-3 of FIG. 2 the coupler device according to FIG. 1.

In the embodiment shown in FIG. 1, each clamping member 11 is displaceable relative to the clamping rod 15 by means of a hydraulic clamp actuator 16. A piston 162 provided in a cylinder housing 161 is rigidly connected to the clamping rod 15, whereby the clamping rod 15 functions as a piston rod. The cylinder housing 161 is formed with an extension part 161a at its distal end and foundation part 161b at its proximal end. The length of the extension part 161a corresponds to the stroke of the piston 162. The piston 162 divides the cylinder housing 161 into a first chamber 163a and a second chamber 163b. The clamping rod 15 extends through both ends 161a, 161b of the cylinder housing 161, in bores 165a, 165b. The foundation part 161b of the cylinder housing 161 is connected to a plane outer surface 111 of the clamping member 11 via an elastic pad 17 by means of retaining bolts 114, see e.g. FIG. 3. The clamping rod 15 extends through a bore 171 in the elastic pad, see FIG. 1A. The retaining bolts 114 extend through retaining bolt holes 164, 171 in the cylinder foundation 161b and in the elastic pad 17, respectively. Each cylinder housing 161 is connected to a clamping member 11 by means of four retaining bolts 114. The retaining bolts 114 are formed with a large diameter head, and they are mounted with a small axial clearance between the head of the retaining bolt 114 and the foundation 161b of the cylinder housing 161. The retaining bolt holes 164, 171 are sized to be large enough to provide radial clearance to the retaining bolts 114 so as to allow some radial displacement between the clamping member 11 and the clamping rod 15. The elastic pad 17 will allow some movement parallel to the foundation 161b of the cylinder housing 161, and it has ample flexibility to handle misalignments between the outer face 111 of the clamping member 11 and the foundation 161b.

A hydraulic system (not shown) fluidly connects the chambers 163a, 163b on both sides of the piston 162. Seals (not shown) are provided between the piston 162 and the inside of the cylinder housing 161, as well as between the clamping rod 15 and the bore at the ends 161a, 161b of the cylinder housing 161. The seals will typically be of types that are known to persons skilled in the art of hydraulic technology.

When the first, inward chamber 163a is pressurized by hydraulic fluid, and the second, outward chamber 163b at the same time is evacuated, the clamping member 11 as well as the cylinder housing 161 and a support 19 to which the clamping member 11 is connected, will be displaced relative to the clamping rod 15, the piston 162, and the first connector hub 13a towards the connector hubs 13a, 13b for engaging and clamping the connector hubs 13a, 13b together. The function of the support 19 will be explained more in detail below. The hydraulic reaction force will be handled by the clamping rod's 15 becoming anchored in the first connector hub 13a. Likewise, for releasing the connector hubs 13a, 13b, the second, outward chamber 163b is pressurized while the first, inward chamber is evacuated. Since the clamping rod 15, and thereby the piston 162, is rigidly connected to the first connector hub 13a, the pressurized hydraulic fluid will enable displacement of the clamping member 11 and the assembly 161, 19 to which the clamping member 11 is connected. Upon coupling, the holding force securing the clamping member's 11 to the connector hubs 13a, 13b will be provided by the friction force between the clamping members 11 and the connector hubs 13a, 13b in the inclined surfaces 115a, 115b, 136a, 136b. When the inclination/cone angle is equal to or less than the friction angle, the clamping members 11 will be locked to the connector hubs 13a, 13b without external load effects. If however, external loads are needed, the remaining force will provided by the hydraulic pressure in the first chamber 163a.

As can be best seen in detail on FIG. 1B, the coupler device 1 further comprises additional safety locking means 18 as a backup for the hydraulics. In the embodiment shown, the safety locking means 18 comprises a wedge 182 configured to engage with locking nuts 183 provided at a recessed, threaded distal end 151 of the clamping rod 15.

The wedge 182 is energizable by means of a small actuator 181, see FIG. 1. In FIG. 1, a safety locking means 18 on the right hand side is shown engaging locking nuts 183 to secure the axial position of the clamping rod 15. For illustrative purposes, a safety locking means 18 on the left hand side is shown not engaging the locking nuts 183 on the clamping rod 15 on the left hand side. The safety locking means 18 are suspended from supports 19, the supports 19 being connected to the extension part 161a of the cylinder housing 161, thus forming a part of a clamping member-assembly. The locking nut's 183 axial position on the threaded, distal end 151 of the clamping rod 15 may be adjusted to a preferred locked position of the clamping rod 15. Alternatively to using the safety locking means 18 as a backup, the safety locking means may be used as a mechanical lock for permanently holding back the remainder of the loads on the clamping members 11.

Figure 10:
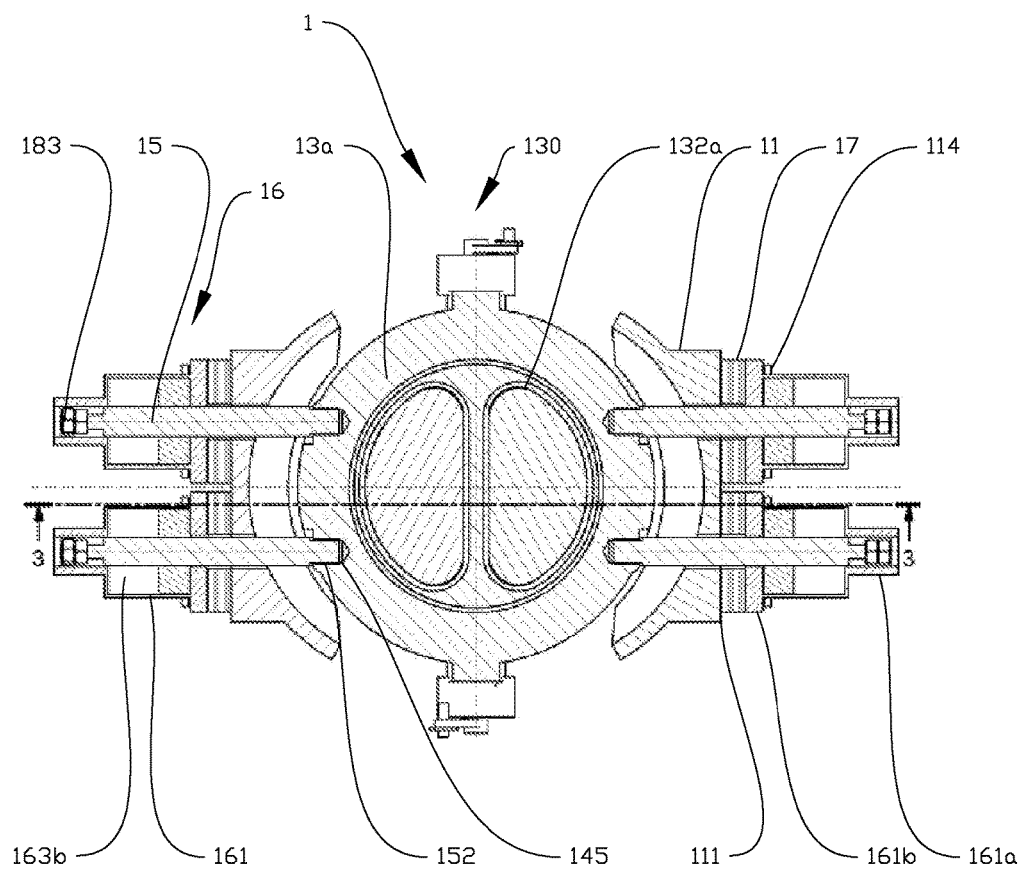
FIG. 10 shows in a similar view as in FIG. 2 the coupler device of FIG. 1 in a second position.

As can be best seen in FIG. 10, where the clamping members 11 are shown in a second, retracted position, the diameter of the locking nuts 183 is smaller than the bore 165a in the cylinder housing 161 through which the clamping rod 15 is extending. The extension part 161a of the cylinder housing 161 can thus be retracted beyond the clamping nuts 183 and the distal end 151 of the clamping rod 15 for releasing the connector hubs 13a, 13b.

Figure 9:
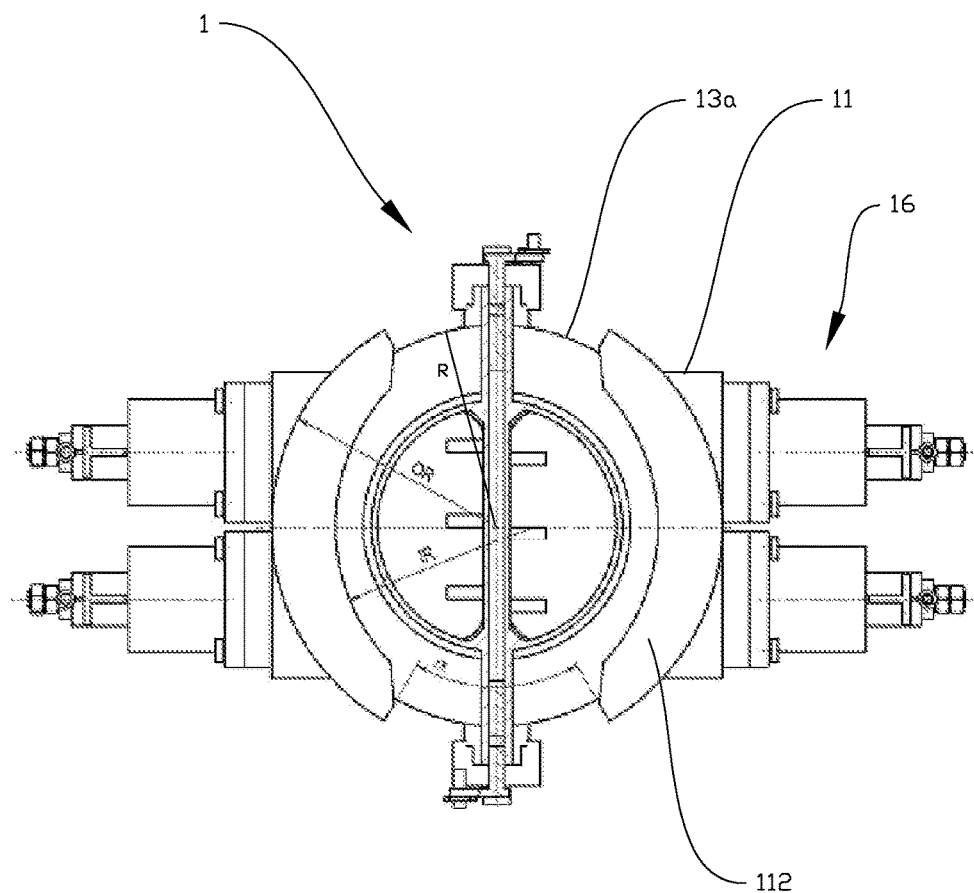
FIG. 9 shows as seen through the line 9-9 of FIG. 3 the coupler device according to FIG. 1.

With reference to FIG. 9, it can be seen that the clamping members 11 are provided with arc-shaped clamping surfaces 112 fitting complementary to outer surfaces on the connector hubs 13a, 13b. The arc-shaped clamping surfaces 112 have an outer radius OR and an inner radius IR. Each of the clamping surfaces 112 covers a semicircle minus an angle α, thus leaving space for the valve actuators 130. As can be seen from FIG. 9, the center of the outer radius OR is more or less coinciding with the center of the connector hubs 13a, 13b having a radius R. The center of the inner radius IR is offset relative to the center of the outer radius OR. For a quick release, and for the clamping members 11 having to be retracted in as small a distance as possible for releasing the connector hubs 13a, 13b, the connector hubs 13a, 13b, or at least the second connector hub 13b, should have a radius R similar to the inner radius IR of the clamping surface 112. Further, the similar radii R and IR are also preferable for avoiding point contact between the ends of the clamping members 11 and the connector hubs 13a, 13b during initial engagement.

Figure 4:
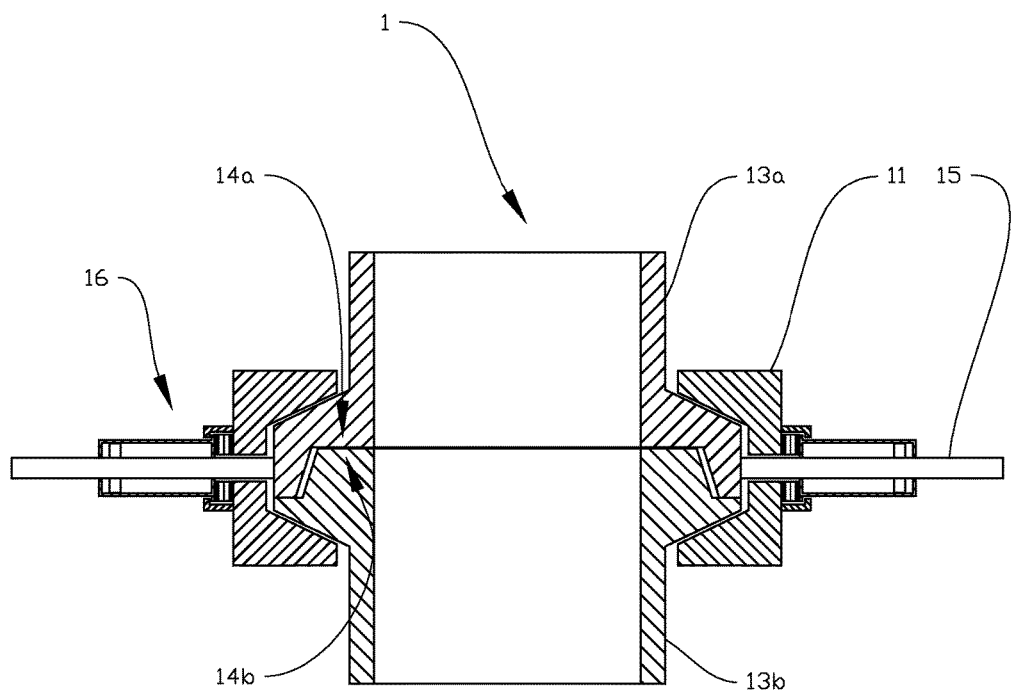
FIG. 4 shows in a schematic cross-sectional side view a coupler device according to at least one embodiment of the present disclosure in a first position.

Disclose in FIG. 4 is another embodiment of a coupler device 1 made in accordance with principles disclosed herein. The coupler device 1 according to this embodiment is not provided with valves. Neither is the coupler device 1 of FIG. 4 provided with safety locking means. The coupler device 1 of FIG. 4 is shown in a first, clamping position. The clamping members 11 are energized by a hydraulic actuator 16 similar to the one described above.

Figure 5:
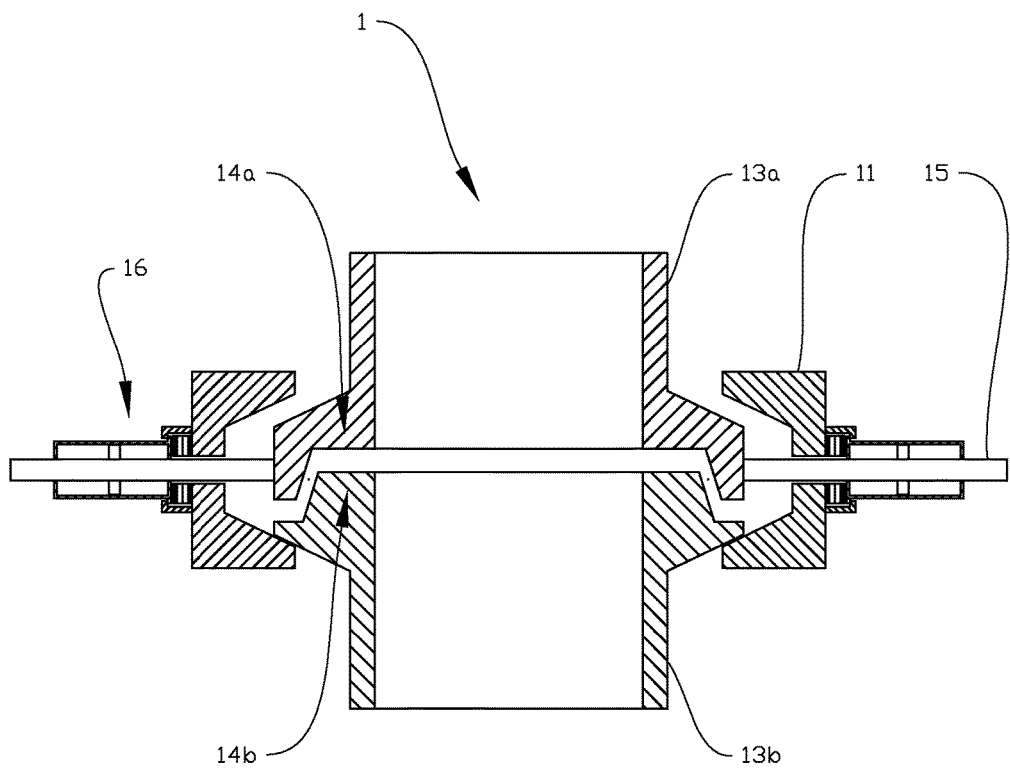
FIG. 5 shows in a schematic cross-sectional side view the coupler device of FIG. 4 in a second position.

In FIG. 5, the coupler device 1 of FIG. 4 is shown in a second, released position. The clamping members 11 are being forced away from the connector hubs 13a, 13b, and the second connector hub 13b is almost free to be removed from the first connector hub 13a and the clamping members 11.

Figure 6:
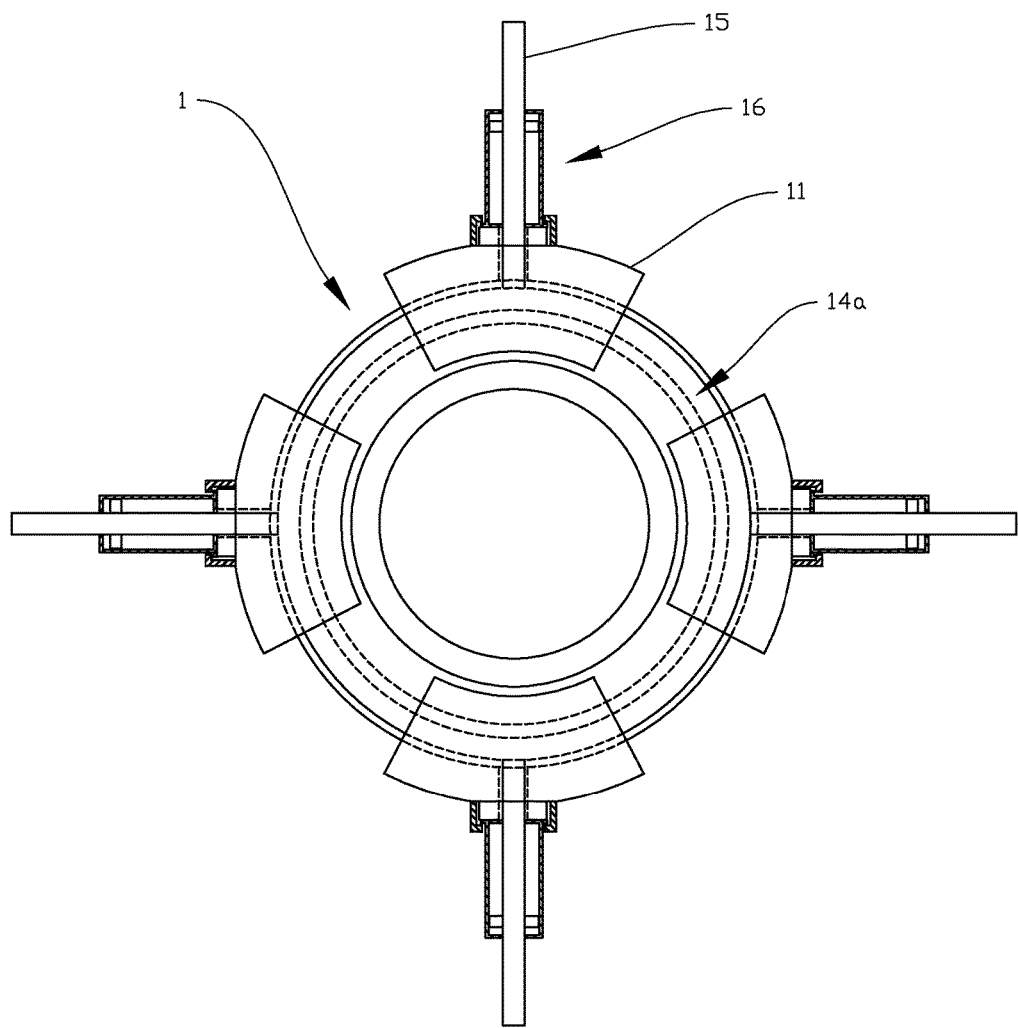
FIG. 6 shows in a top view the coupler device of FIG. 4.

FIG. 6 shows the coupler device 1 of FIG. 4 in a top view. In contrast to the embodiment described above with reference to FIG. 1, the clamp of this embodiment comprises four clamping members 11, each provided with a hydraulic actuator 16 and one clamping rod 15. The clamping members 11, with the appurtenant actuators 16 and clamping rods 15 are substantially evenly distributed around the circumference of the first connector hub 13a.

Figure 7:
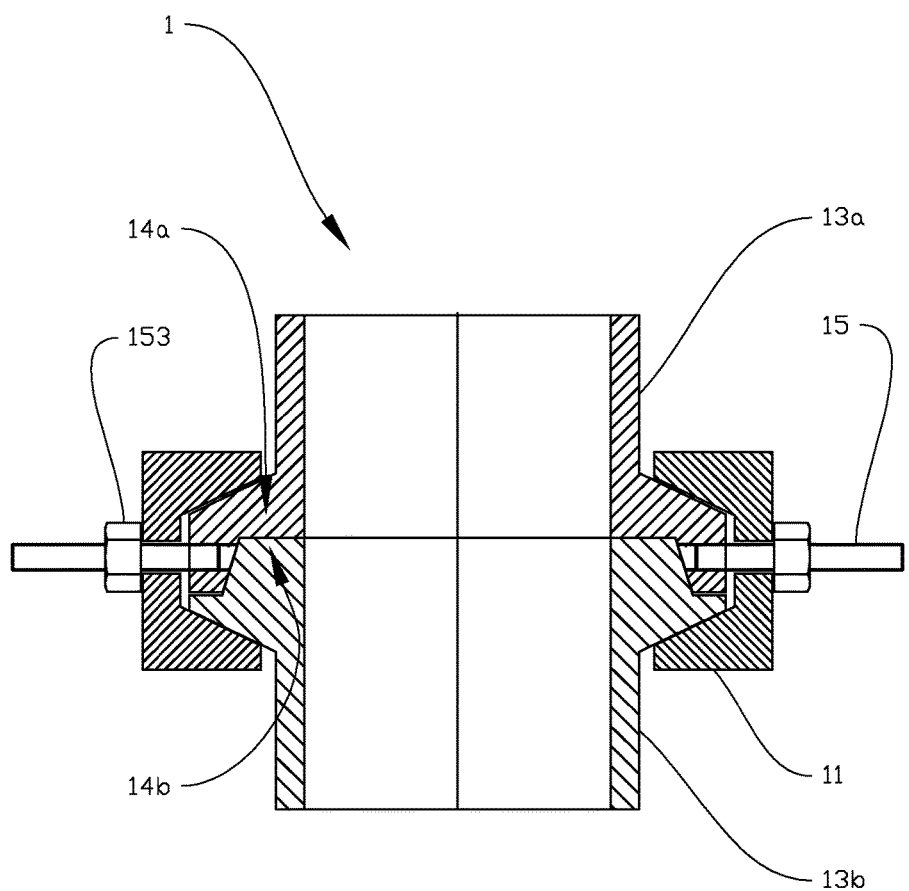
FIG. 7 shows in a schematic cross-sectional side view a coupler device according to at least one embodiment of the present disclosure.
Figure 8:
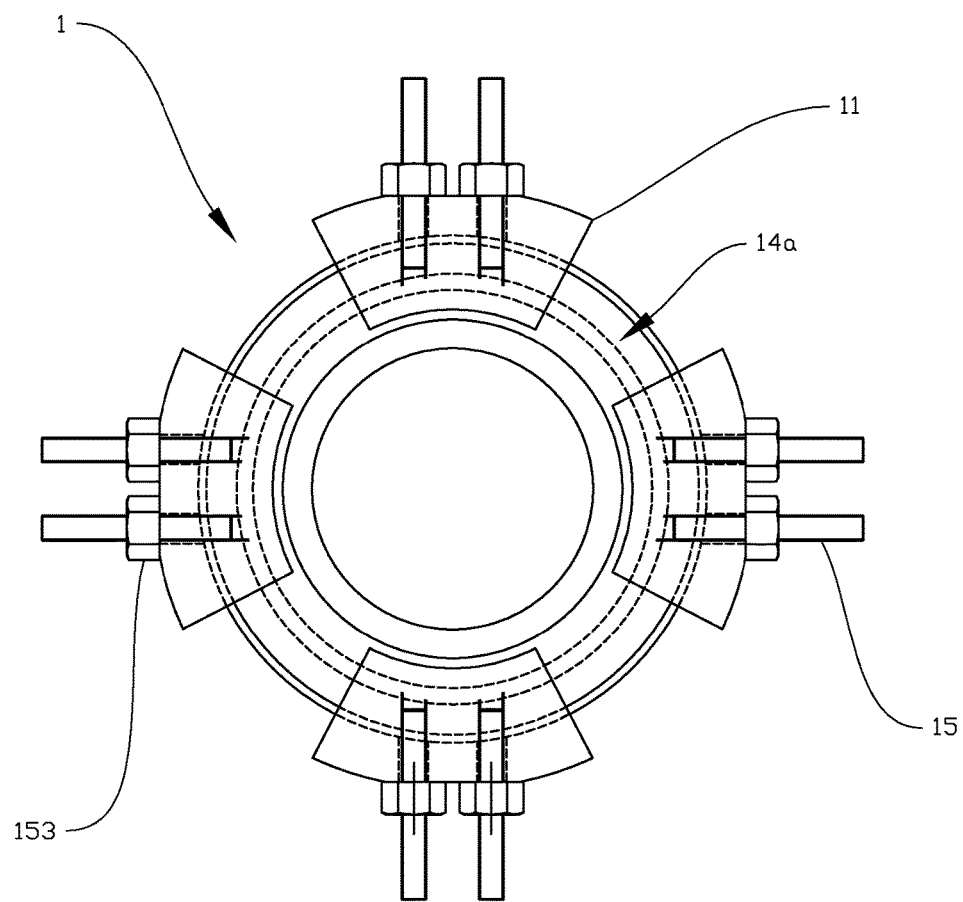
FIG. 8 shows in a top view the coupler device of FIG. 7.

In FIGS. 7 and 8, a third embodiment of a coupler device 1 is shown. The coupler device 1 of FIGS. 7, 8 utilizes clamping nuts 153 for pre-tensioning the clamping members 11, each clamping member 11 being provided with two clamping rods 15, each clamping rod 15 with one clamping nut 153. This embodiment may be useful for smaller coupler devices 1.

Figure 2:
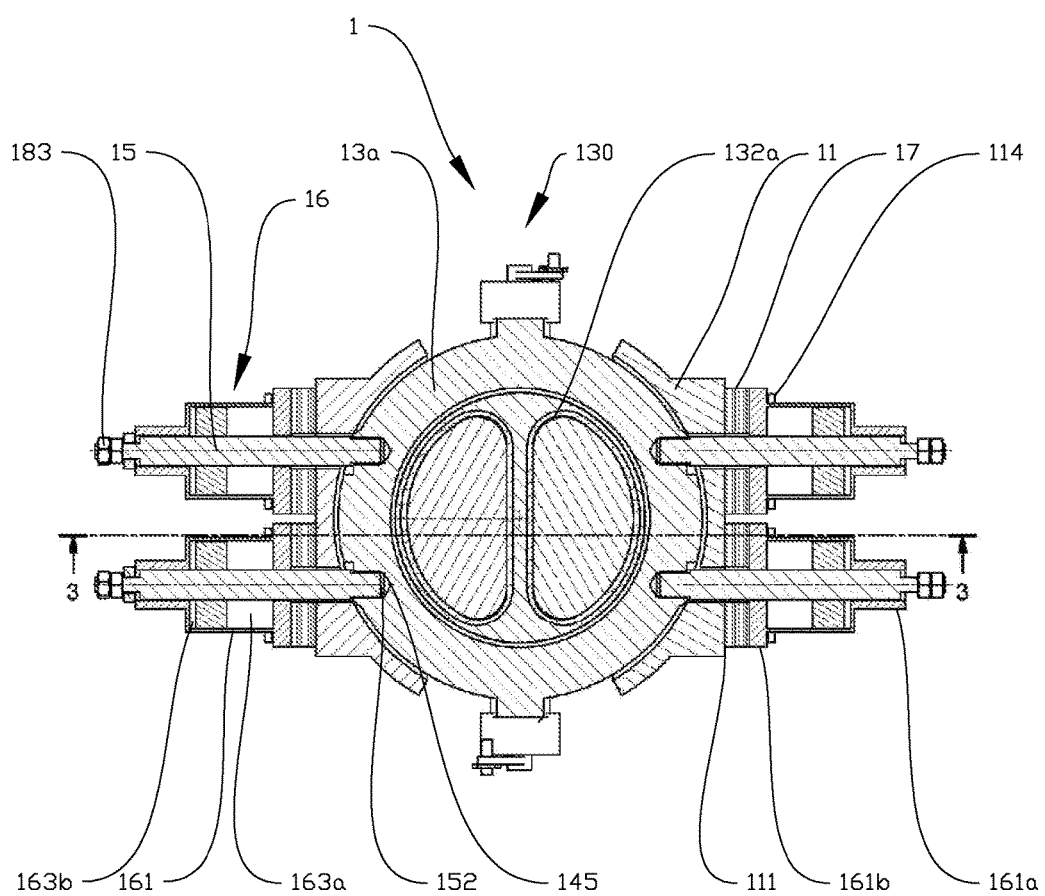
FIG. 2 shows as seen through the line 2-2 of FIG. 1 the coupler device according to FIG. 1 in a first position.

In FIG. 10, the coupler device 1 of FIG. 2 is shown in a second, retracted position. Hydraulic fluid in the second chamber 163b is forcing the cylinder housing 161 outwards. The tension force is further handled by the retaining bolts 114 pulling the clamping member 11 out of engagement with the connector hubs 13a, 13b. This arrangement allows for a larger and more controlled force to be applied for pulling the clamping members 11 out of engagement. A small wedging angle is preferable for high amplification of the forces applied to the clamping members 11 to the axial preloading effects between the opposing mating surfaces 14a, 14b of the connector hubs 13a, 13b. This low wedging angle between the clamping surfaces 115a, 115b, 136a, 136b provides that the clamping members 11 will be self-locking or close to it. Axial tension forces and/or internal pressure in a pipe conduit will tend to separate the two connector hubs 13a, 13b. A clamping member 11 self-locking to the connector hubs 13a, 13b will remain in radial position relative to the connector hubs 13a, 13b when axial forces are applied, without varying the forces of the pre-tensioning means and without galling effects between the inclined surfaces 115a, 115b on the clamping members 11 and the inclined surfaces 136a, 136b on the connector hubs 13a, 13b. Finally, the variation in compression or separation distance between opposing mating surfaces 14a, 14b on the connector hubs 13a, 13b will be of less vital importance for the sealing conditions for the coupler device 1.

Figure 11:
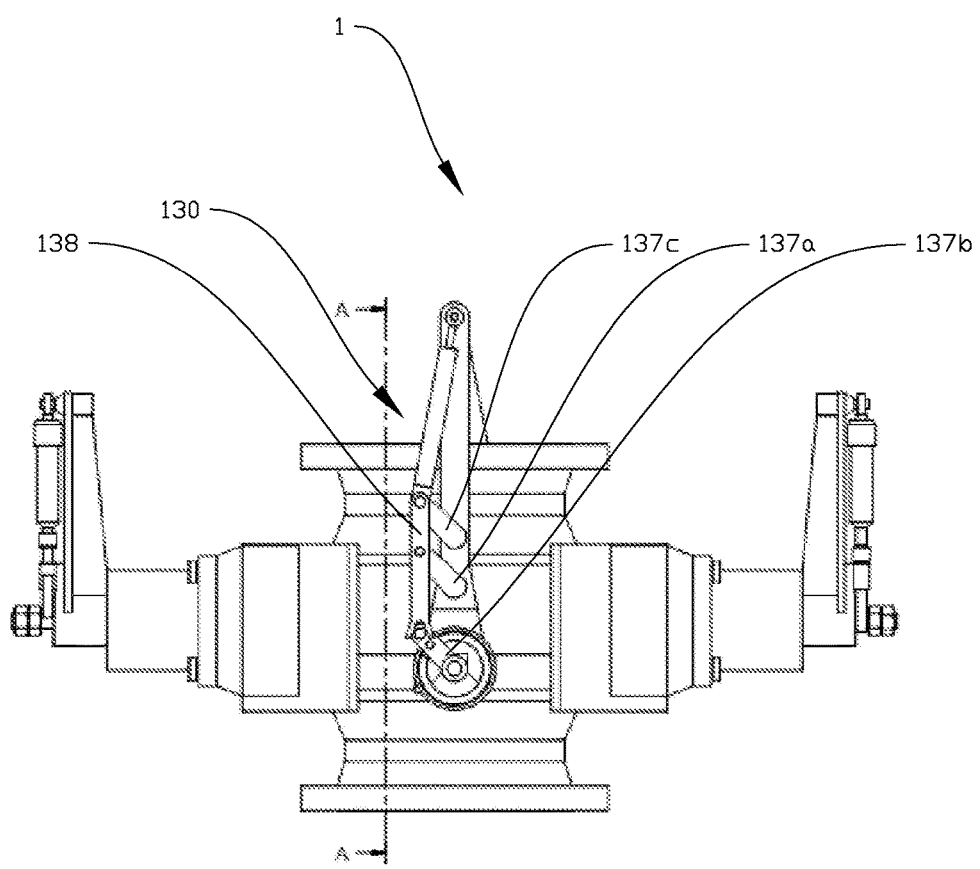
FIG. 11 shows in a side view a coupler device according to at least one embodiment of the present disclosure.
Figure 12:
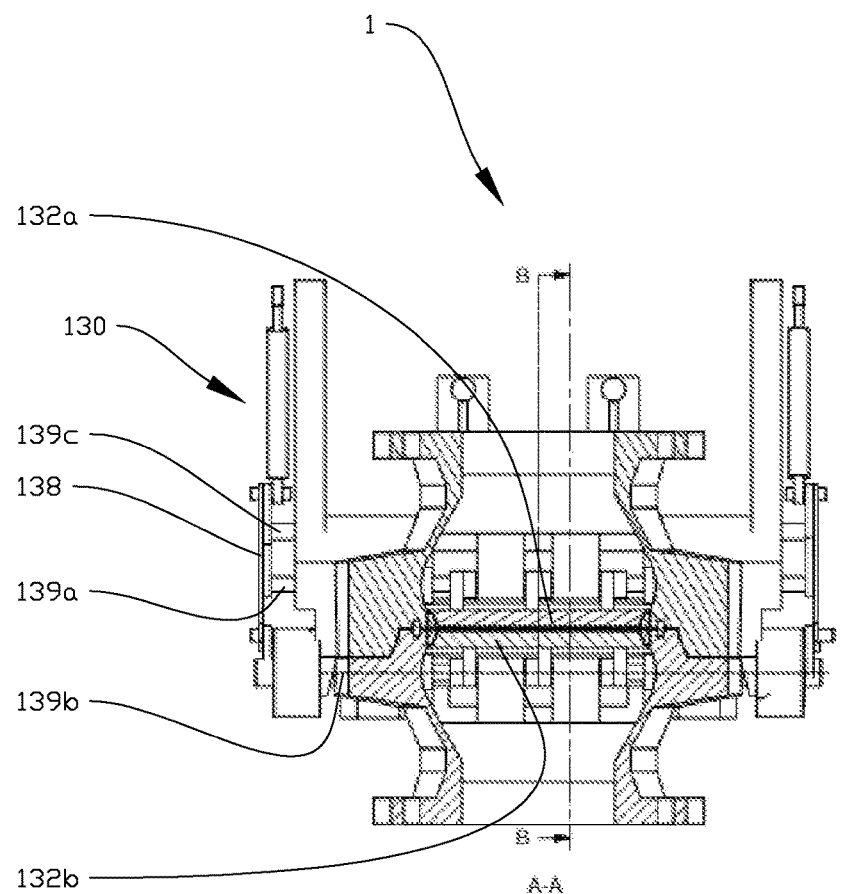
FIG. 12 shows as seen through the line A-A of FIG. 11 the coupler device of FIG. 11.
Figure 13:
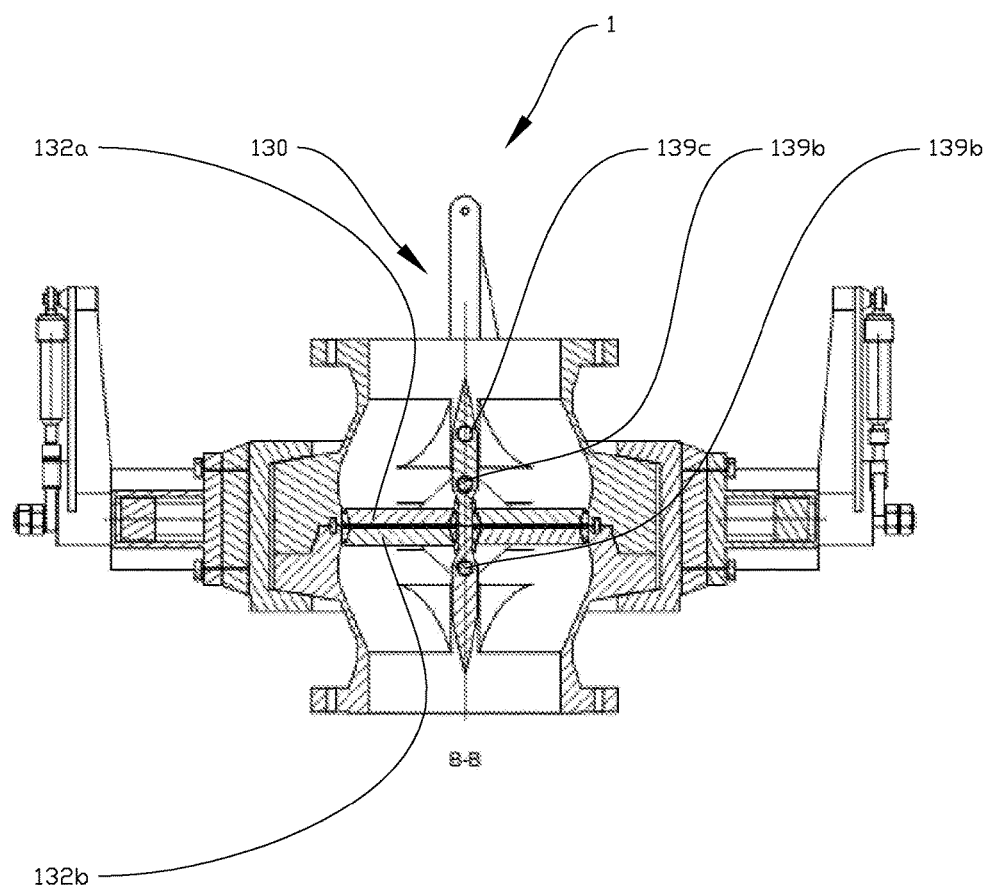
FIG. 13 shows as seen through the line B-B of FIG. 12 the coupler device of FIG. 12.

FIG. 11 shows a perspective side view of the coupler device 1 of FIG. 1, with FIGS. 12 and 13 showing different cross-sections of the coupler device 1. The valve actuator 130 is shown coupled to a connector 138 in the form of an elongated extension arm formed with a wedge on its distal end. The extension arm 138 is connected to the first connector hub 13a via a first, idle handle 137c and a second handle 137a. The second handle 137a operating the valve vanes 132a of the first connector hub 13a through a shaft 139a. The idle handle 137c is connected to the first connector hub 13a in a bore 139c. The extension arm 138 is further connected to the second connector hub 13b via a handle 137b to which the valve vanes 132b of the second connector hub 13b are connected through a shaft 139b. A biasing member (not shown), which may be a coil spring or the like, is resiliently forcing the valve vanes 132b towards a closed position. When the connector hubs 13a, 13b are being coupled, the extension arm 138 of the valve actuator 130 on the first connector hub 13a is pressurized into engagement with the handle 137b of the second connector hub 13b, thus opening the valve vanes 132b. This embodiment of the valve arrangement leaves very little space between the valve vanes 132a, 132b of the first and second connector hubs 13a, 13b when the valve vanes 132a, 132b are in a closed position, which may be an advantage for avoiding any substantial leakage of fluids upon disconnection of the connector hubs 13a, 13b.

The invention claimed is:

1. A coupler device for coupling first and second pipe bodies, the coupler device comprising:
   a first connector hub configured to be connected to the first pipe body;

a second connector hub configured to be connected to the second pipe body;
a clamp configured to clamp the first and second connector hubs together, the clamp comprising two or more clamping members; and
two or more clamping rods, along which the clamping members are configured to be displaced, the at least two clamping rods being rigidly connected to the first connector hub;
wherein each clamping member is configured to be displaceable along the two or more clamping rods by means of at least one hydraulic actuator, each hydraulic actuator comprising a hydraulic cylinder disposed in a cylinder housing and a piston disposed and displaceable in the cylinder housing, wherein the piston is rigidly connected directly to a clamping rod.

2. The coupler device according to claim 1, wherein the clamping members comprise inner inclined clamping surfaces configured to fit complementary to outer inclined clamping surfaces on the connector hubs for clamping the connector hubs together.

3. The coupler device according to claim 1, wherein the first connector hub and the second connector hub each comprise inclined mating surfaces, and wherein the inclined mating surfaces of the first connector hub fit complementary to the inclined mating surfaces on the second connector hub, whereby the two connector hubs are centered with respect to each other prior to clamping the connector hubs together.

4. The coupler device according to claim 1, wherein the two or more clamping members are substantially evenly distributed around the first connector hub.

5. The coupler device according to claim 1, wherein each of the two or more clamping members is configured to be displaceable along two spaced apart, substantially parallel clamping rods.

6. The coupler device according to claim 1, wherein one end of each cylinder housing is connected to a clamping member.

7. The coupler device according to claim 6, wherein the one end of each cylinder housing is connected to a clamping member via an elastic pad.

8. The coupler device according to claim 1 wherein each of the two or more clamping rods comprises a safety locking means.

9. The coupler device according to claim 8, wherein the safety locking means includes locking wedges configured to engage with locking nuts provided at distal ends of the clamping rods.

10. The coupler device according to claim 9, wherein the locking nuts have a diameter which is smaller than the diameter of a bore provided in the cylinder housing through which the clamping rod extends.

11. The coupler device according to claim 1, wherein each clamping member is configured to be displaceable along the clamping rods by means of clamping nuts.

12. The coupler device according to claim 1 wherein the clamping members comprise substantially arc-shaped outer clamping surfaces having an inner radius (IR) and an outer radius (OR), and wherein the inner radius (IR) is substantially equal to a radius (R) of the connector hubs.

13. A coupler device for coupling first and second pipe bodies, the coupler device comprising:
a first connector hub configured to be connected to the first pipe body;
a second connector hub configured to be connected to the second pipe body;
a clamp configured to clamp the first and second connector hubs together, the clamp comprising two or more clamping members; and
two or more clamping rods, along which the clamping members are configured to be displaced, the at least two clamping rods being rigidly connected to the first connector hub;
wherein each of the first and second connector hubs comprises a closure configured to close a pipe body.

14. The coupler device according to claim 13, wherein the closure of the second connector hub comprises a biasing means for closing the closure as the second connector hub is decoupled from the first connector hub.

15. A method for coupling first and second pipe bodies by means of a coupler device, the method comprising the steps:
connecting a first pipe body to a first connector hub;
connecting a second pipe body to a second connector hub;
bringing the connector hubs into proximity and substantially centralizing the two connector hubs; and
displacing clamping members along clamping rods that are rigidly connected to the first connector hub, the displacement being in a direction towards the connector hubs to clamp the connector hubs together;
wherein the displacing is accomplished by actuating at least one hydraulic actuator, each hydraulic actuator comprising a hydraulic cylinder disposed in a cylinder housing and a piston disposed and displaceable in the cylinder housing, wherein the piston is rigidly connected directly to a clamping rod.

16. The method according to claim 15, further comprises transferring fluid between the first and second pipe bodies through the connector hubs.

17. The method according to claim 16, further comprising displacing the clamping members away from the connector hubs to release the connector hubs from each other.

* * * * *